United States Patent [19]
Orth

[11] 4,148,461
[45] Apr. 10, 1979

[54] SELF-ALIGNING SCISSOR TYPE JACK

[76] Inventor: Joseph P. Orth, 150 S. Washington, Wichita, Kans. 67202

[21] Appl. No.: 931,991

[22] Filed: Aug. 8, 1978

[51] Int. Cl.² .............................................. B66F 3/22
[52] U.S. Cl. .................................. 254/86 R; 254/122
[58] Field of Search ................. 254/45, 86 R, 86 H, 254/122, 126; 81/52.4 R, 52.4 A; 280/763

[56] References Cited

U.S. PATENT DOCUMENTS

| | | | |
|---|---|---|---|
| 2,567,681 | 9/1951 | Schwartz et al. | 254/122 |
| 2,747,836 | 5/1956 | Sherman | 254/86 R |
| 3,669,409 | 6/1972 | Eranosian | 254/45 |
| 4,041,729 | 8/1977 | Bilz | 81/52.4 R |

FOREIGN PATENT DOCUMENTS 608937  5/1926  France ..................................... 254/126

*Primary Examiner*—Robert C. Watson
*Attorney, Agent, or Firm*—Edwin H. Crabtree

[57] ABSTRACT

A self-aligning scissor type jack for leveling a vehicle on a ground surface. The jack adjusts to sloping ground surfaces for leveling the vehicle thereon and preventing uneven loads being placed on the jack and the frame of the vehicle. The jack by design can be quickly bolted laterally across the rear of the vehicle frame thereby requiring a minimum time for installation. The jack further provides additional strength to the frame structure.

9 Claims, 7 Drawing Figures

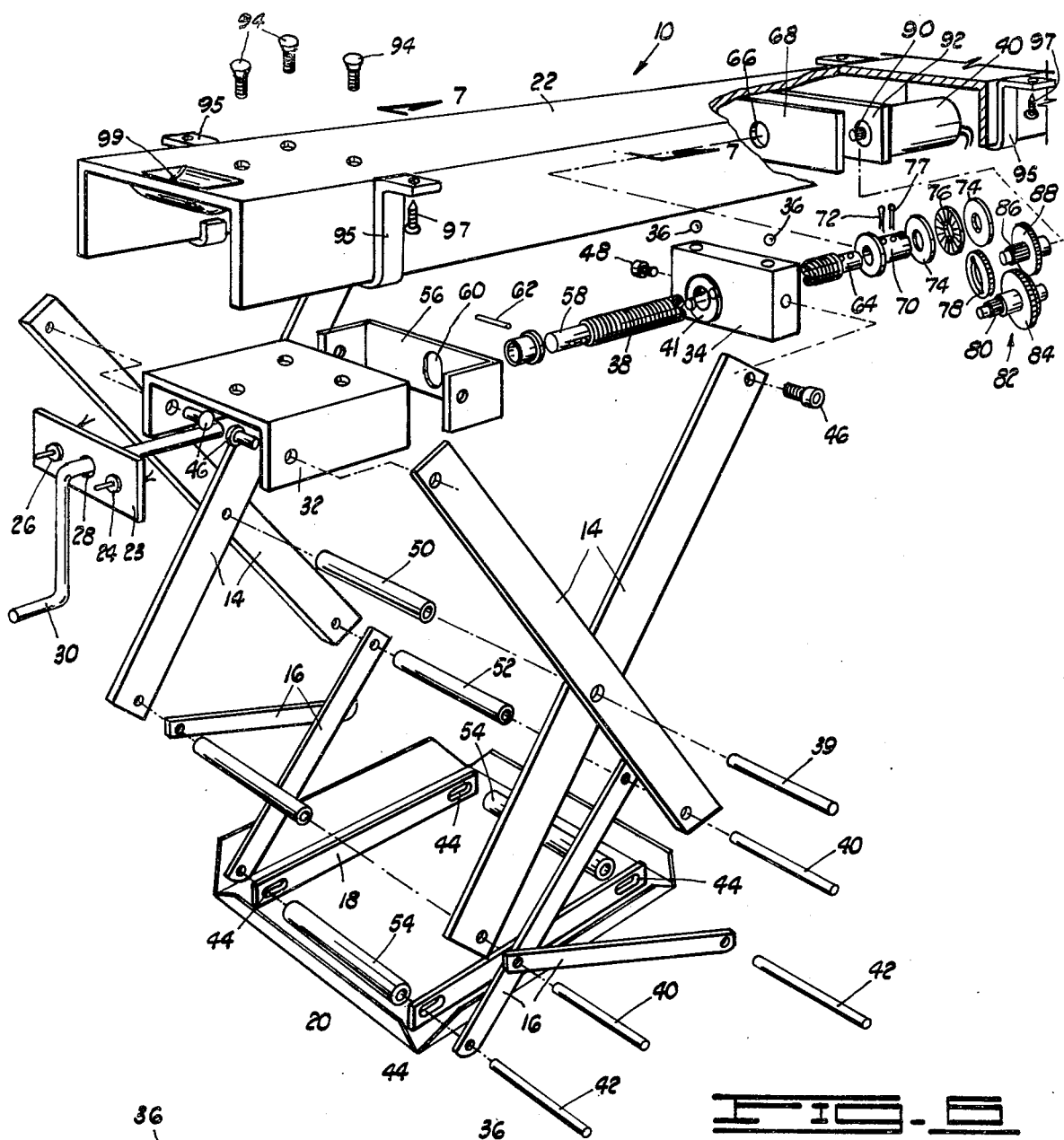
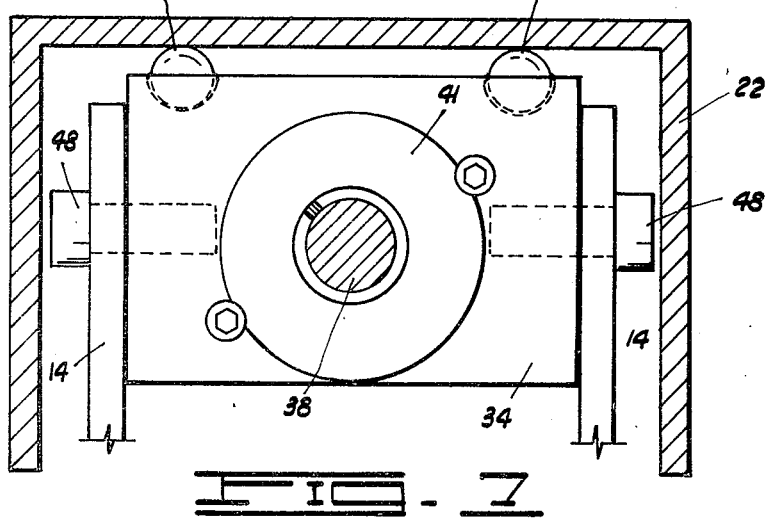

SELF-ALIGNING SCISSOR TYPE JACK

BACKGROUND OF THE INVENTION

The invention relates to a vehicle jack used for leveling vehicles or the like and more particularly, but not by way of limitation, to a self-aligning scissor type jack for mounting underneath the frame of the vehicle.

Heretofore, there have been various types of scissor jacks, electrical retractable jacks, bumper style jacks, and electrical and hydraulic operated load stabilizers. In particular, a scissor type power operated jack is disclosed in U.S. Pat. No. 2,747,836 to Sherman. This scissor type jack is raised and lowered by a motor driven screw which is similar in some respects to the subject invention, but does not disclose the advantages of self-alignment when contacting sloping ground surfaces. U.S. Pat. No. 3,997,143 to Rose also discloses a motor driven scissor type jack which is raised and lowered using a threaded screw. Again, while this jack is similar in some respects to the subject invention, it does not disclose the self-aligning features of the subject invention.

In U.S. Pat. No. 4,055,329 to Hammon, U.S. Pat. No. 2,218,733 to Watts, and U.S. Pat. No. 2,621,021 to Dahl et al, scissor type jacks which are hydraulically, electrically, and manually operated are disclosed. Here again, none of these prior art jacks disclose the specific advantages and structural features of the subject invention.

SUMMARY OF THE INVENTION

The subject self-aligning scissor type jack provides a vehicle jack which aligns itself on sloping ground surfaces so that uneven loads placed on the jack may be distributed onto the bottom of the vehicle and excessive loads are not placed at any particular point on the jack which would cause the jack to bind or possible damage to the structure of the jack.

The self-aligning jack includes a "U"-shaped channel which is mounted on the bottom of the frame of the vehicle and extends laterally across the width of the vehicle. The channel distributes the load across the width of the frame thereby preventing uneven loads on the floor of the vehicle which make it difficult to open and close doors and cabinet drawers in the vehicle. Also, the channel adds rigidity to the frame of the vehicle.

The scissor type jack by its design has a low profile and requires a minimum amount of clearance for receipt underneath the frame of the vehicle. The invention is rugged in design, easy to install underneath various types of vehicles, and may be operated electrically from the vehicle's battery or manually.

The self-aligning scissor type jack includes an inverted "U"-shaped channel adapted for mounting underneath the frame of the vehicle. Two pair of parallel pinned scissor arms are pivotally attached to the "U"-shaped channel. The lower ends of the arms are pinned to two pair of floating scissor links. The lower ends of the links are attached to a pair of parallel load distribution feet. The feet include elongated slots therein so that when the jack is lowered and the load distribution feet contact the ground surface, the ends of the links are adjusted on the feet thereby distributing the load thereon and distributing the load to the arms. The upper end portion of the arms are attached to a drive means mounted on the "U"-shaped channel. The drive means includes an elongated screw threadably received through a bearing block. The bearing block is pivotally attached to the upper end portion of the arms. One end of the threaded screw is attached to an electrically driven gear motor. When the motor is activated, the threaded screw is rotated through the bearing block which moves the linear distance between the upper end portion of the arms thereby raising and lowering the jack on the vehicle. Should the electric gear motor fail for one reason or another, the elongated screw may be turned manually by a handle thereby turning the screw, moving the bearing block on the screw, and moving the linear distance between the upper end portion of the arms.

The advantages and objects of the invention will become evident from the following detailed description when read in conjunction with the accompanying drawings which illustrate the preferred embodiments of the invention.

BRIEF DESCRIPTION OF THE DRAWINGS

FIG. 6 is a perspective view of the individual parts of the self-aligning scissor type jack.

FIG. 7 is a sectional view taking along lines 6—6 showing an enlarged view of the bearing block and "U"-shaped channel.

DETAILED DESCRIPTION OF THE DRAWINGS

Figure 1:
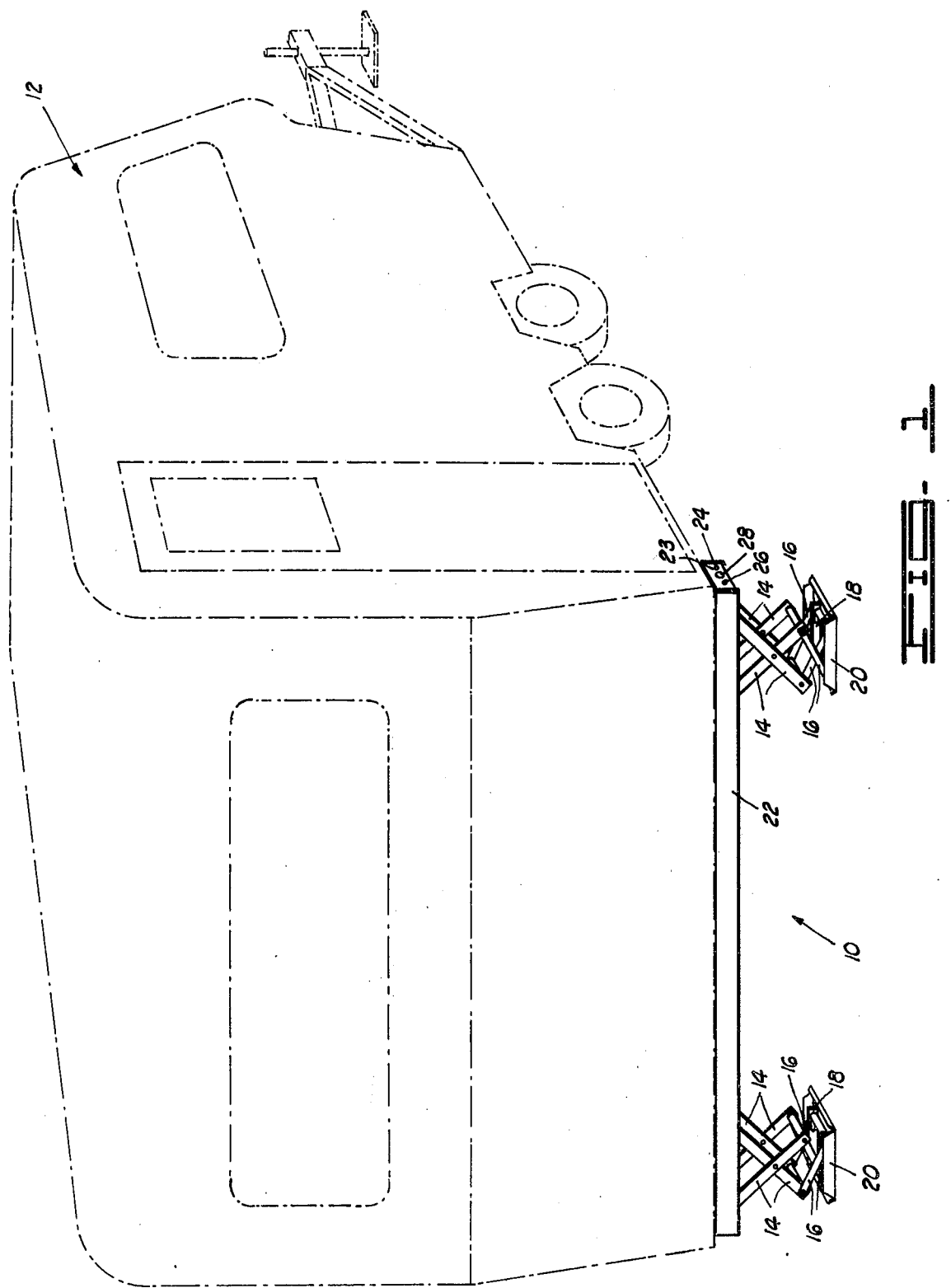
FIG. 1 is a perspective view of a trailer with the self-aligning scissor type jack mounted laterally at the rear of the vehicle frame.

In FIG. 1, the self-aligning scissor type jack is designated by general reference numeral 10. In this view, the jack 10 can be seen mounted laterally underneath the rear of the frame of a trailer 12. While the jack 10 is shown mounted underneath the frame of the trailer 12, it should be appreciated that the jack 10 may be used equally well on recreational vehicles, mobile homes, and various other types of vehicles and equipment needing a self-aligning jack.

Broadly, the jack 10 includes two pairs of pinned scissor arms 14 pivotally attached to two pairs of floating scissor links 16. The lower end portion of the links 16 are attached to a pair of parallel load distribution feet 18. A ground engaging pad 20 is attached to the bottom of the load distribution feet 18 for spreading the load equally onto the load distribution feet 18 and preventing the feet 18 from sinking into a soft ground surface. The upper end portion of the arms 14 are pivotally attached to an inverted "U"-shaped channel 22 which extends across the width of the trailer 12. The channel 22 houses a drive gear motor for raising and lowering the jack 10 from underneath the trailer 12. One end of the channel 22 includes a switch plate 23 having a pair of electric switches 24 and 26 which are wired to the individual drive gear motors for individually raising and lowering the two jacks 10 shown in FIG. 1. Also an opening 28 in the switch plate 23 is shown for receiving a handle 30, which may be used for lowering the jack 10 manually should for one reason or the other the electric motor fail to operate. The handle 30 is shown in FIG. 6.

It should be noted that the jack 10 includes the channel 22, but a single channel 22 extending laterally across the rear of the trailer 12 may act as a base for more than one jack 10. Also the common channel 22 by design provides a means for quickly installing a pair of jacks 10 requiring the bolting of the channel 22 to the bottom of the frame of the trailer 12. The only other requirement is to connected the electrically driven gear motors to a power source.

Figure 2:
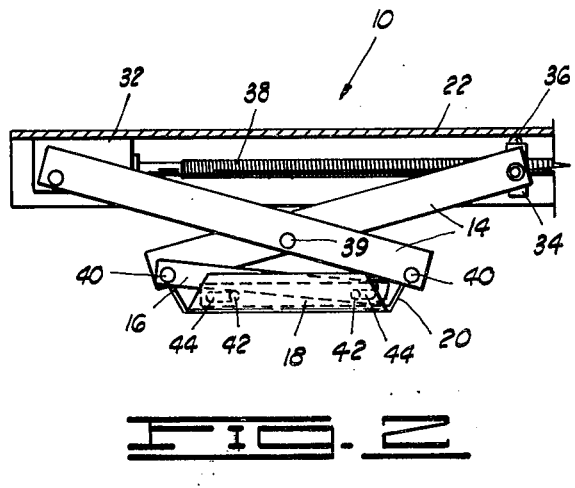
FIG. 2 is a front view of the self-aligning jack in a retracted position.

In FIG. 2, the jack 10 is shown in a retracted position. The channel 22 is shown in cross section and having a "U"-shaped arm attachment channel 32 mounted at one end of the channel 22 and pivotally attached to the upper end portion of two of the pinned scissor arms 14. The upper end portion of the other two pinned scissor arms 14 are pivotally attached to a bearing block 34 having a pair of ball bearings 36 mounted in the top thereof. The bearing block 34 and ball bearings 36 are shown more clearly in FIG. 7. One end of an elongated threaded screw 38 is attached to the attachment channel 32. The other end of the threaded screw 38 is geared to an electric drive gear motor 40. The motor 40 is shown in FIG. 6. The screw 38 is threaded through a nut 41 mounted in the center of the bearing block 34. When the screw 38 is rotated, the bearing block 36 moves the linear distance between the upper end portions of the arms 14 thereby raising and lowering the jack 10.

The pinned scissor arms 14 are crossed and pinned together by a pin 39. The lower portion of the arms 14 are pivotally attached to the upper portion of the links 16 by upper support pins 40. The floating scissor links 16 are crossed but not pinned together. The lower end portion of the links 16 are attached to lower support pins 42 which are slidably received in elongated slots 44 in the ends of the load distribution feet 18.

With the jack 10 in a retracted position, the lower support pins 42 have moved the links 16 toward the center of the load distribution feet 18 with the ends of the lower support pins 42 engaging the inside ends of the slots 44. In FIGS. 2, 3, 4, and 6, the load distribution foot 18 and elongated slots 44 are shown in dotted lines.

Figure 3:
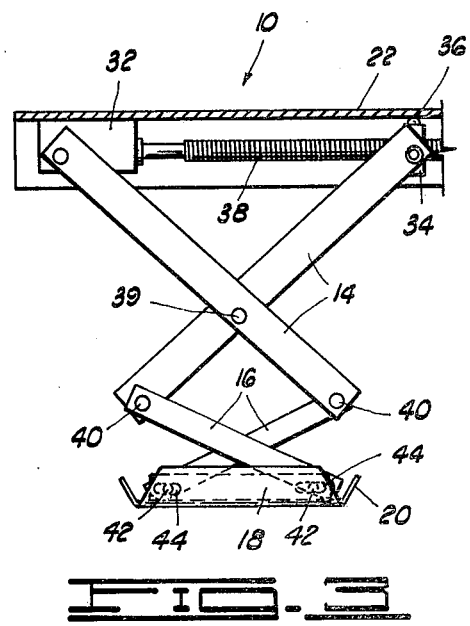
FIG. 3 is a front view of the jack in a partially extended position.

In FIG. 3, the screw 38 has rotated, moving the bearing block 36 to the left, thereby lowering the jack 10. The jack 10 is shown in a partially extended position with the lower support pins 42 moving the links 16 to a position in the center of the elongated slots 44.

Figure 4:
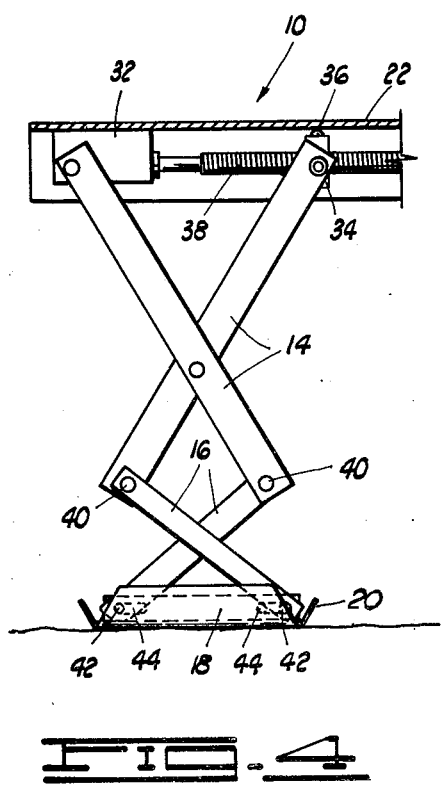
FIG. 4 is a front view of the jack in a extended position and disposed on top of a level ground surface.

In FIG. 4, the jack 10 is in a completely extended position with the ground engaging pad 20 and load distribution feet 18 resting on top of a level ground surface. In this position, the lower support pins 42 have moved the links 16 outwardly to the outside ends of the elongated slots 44 and the load on the jack 10 is distributed across the lower surface of the load distribution foot 18 upwardly onto the links 16 and to the arms 14.

Figure 5:
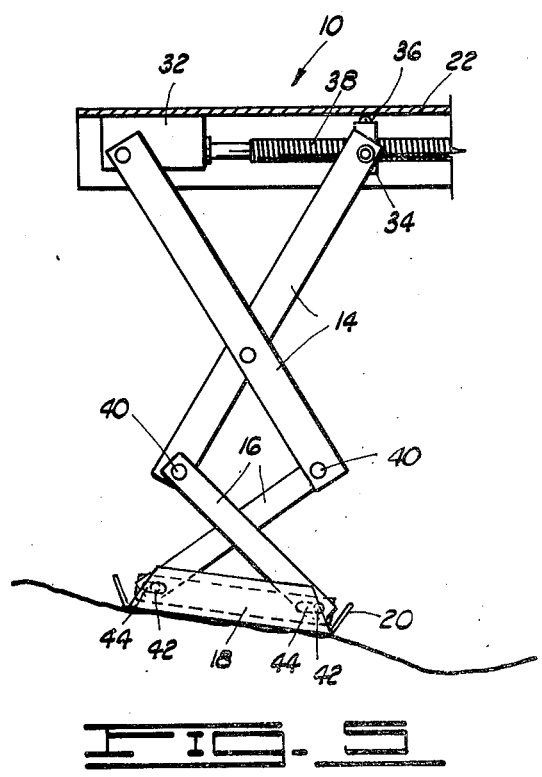
FIG. 5 is a front view of the jack in an extended position and disposed on top of a sloping ground surface.

In FIG. 5, the jack 10 is in an extended position but resting on a sloping ground surface. Because the floating links 16 are not pinned together, the ends of the links 16 attached to the lower support pins 42 are able to slide in the elongated slots 44 in the load distribution foot 18. The foot 18 and ground engaging pad 20 align themselves with the sloping ground surface thereby preventing an excessive load to be placed on the load distribution foot 18 and links 16. As can be seen in FIG. 5, one of the links 16 and lower support pin 42 have slid to the outside end of the elongated slot 44 in the foot 18 while the other link 16 an lower support pin 42 have slid to the inside end of the slot 44. The ability of the links 16 and lower support pins 42 to slide in the elongated slots 44 of the load distribution feet 18 provide the unique feature of allowing the lower portion of the jack 10 to self-align on sloping ground surfaces or irregular objects such as rocks or the like which would cause other types of jacks to become misaligned and prevent the vehicle from being leveled thereon.

In FIG. 6, an exploded perspective view of the individual parts of the jack 10 are illustrated. In this view, the two pairs of scissor arms 14, two pairs of links 16, and the two load distribution feet 18 can be seen parallel to each other and extending downwardly from the inverted "U"-shaped channel 22. The upper end portion of two of the arms 14 are pinned to the attachment channel 32 by pins 46. The upper end portion of the other two scissor arms 14 are pinned to the opposite sides of the bearing block 34 by pins 48. To provide structural rigidity to the two parallel pairs of scissor arms 14, they are pinned together by pin 39 which is received through a pin collar 50. The lower end portion of the arms 14 and the upper end portion of the links 16 are pivotally attached to upper support pins 40. The pins 40 are received through pin collars 52. The pins 40 join together the two parallel pair of arms 14 and links 16 and are perpendicular thereto. Also the lower support pins 42 are received through pin collars 54. The pins 42 join together the parallel load distribution feet 18 and the lower end portion of the links 16 and are perpendicular thereto.

One end of the elongated screw 38 is attached to the attachment channel 32 by a screw attachment plate 56. A first end portion 58 of the screw 38 is received through an enlarged opening 60 in the plate 56 and is pinned thereto by a pin 62. The enlarged opening 60 allows the end portion 58 to float upwardly in the opening 60 that the screw 38 can adjust itself thereon depending on the load placed on the jack 10. A second end portion 64 of the screw 38 is received through an opening 66 in a mounting plate 68. When the end portion 64 of the screw 38 is received through an opening 66, it is mounted on a drive collar 70 and secured thereto by a cotter pin 72. Mounted around the drive collar 70 is a pair of bearing races 74 with a thrust bearing 76 sandwiched therebetween. The thrust bearing 76 relieves the elongated screw 38 of axial loads placed thereon and allows the screw 38 to turn freely in the bearing block 34. The thrust bearing 76 is held on the collar 70 by a cotter pin 77. Also disposed around the drive collar 70 is a drive collar gear 78 which is mounted thereon. The drive collar gear 78 is driven by a pinion gear 80 which extends outwardly from a torque limiter 82 having a drive gear 84. The torque limiter 82 acts as a clutch, and when excessive loads are placed on the jack 10, the torque limiter 82 releases the engagement of the elongated screw 38 from the drive gear motor 40, thereby preventing damage to the jack 10. The drive gear 84 of the torque limiter 82 meshes with a pinion gear 86 mounted on a motor drive gear 88. The motor drive gear 88 meshes with the motor drive shaft 90 which extends outwardly from a drive motor mounting plate 92 which secures the drive motor 40 inside the inverted "U"-shaped channel 22.

The motor 40 is wired to the electrical switch 24 and an electrical power source such as the vehicle's battery. The switch 26 would be wired to a motor 40 on the opposite side of the trailer 12 similar to the two jacks 10, shown in FIG. 1, and having a common channel 22. By having the two switches 24 and 26 together, the two jacks 10 may be raised and lowered without having to walk around opposite sides of the trailer 12. Should the drive motor 40 fail to operate, the jack 10 may be operated manually through the use of the handle 30 which is inserted through the opening 28 in the plate 23 and engaging the first end portion 58 of the screw 38. The second end portion 64 of the screw 38 is disengaged from the drive collar 70 by removing the cotter pin 72. When the drive collar 70 is disengaged from the screw 38, the jack 10 may be operated manually by turning the handle 30 and raising and lowering the jack 10 from the bottom of the trailer 12.

The attachment channel 32 is secured to the inside of the channel 22 by bolts 94. The jack 10 is quickly mounted to the bottom of the trailer 12 by a plurality of "J" shaped adjustable mounting brackets 95. The brackets 95 engage the lower edges of the sides of the channel 22. Prior to tightening the brackets 95 on the trailer 12 with bolts 97, the jack 10 may be adjusted laterally underneath the trailer 12 for proper alignment. This type of installation greatly reduces the time in installing the jack 10 when compared to other types of retractable jacks used on different types of vehicles.

Also seen in the end of the channel 22 is an indented safety stop 99 which is added as a safety feature should for some reason the attachment channel 32 shear the bolts 94, the channel 32 contacts the stop 99 and is pevented from breaking loose from the channel 22.

In FIG. 7, a cross sectional view of the channel 22 is shown taken along lines 7—7 shown in FIG. 6. In this view, the bearing block 34 can be seen with the pair of ball bearings 36 mounted in the top of the block 34 and disposed against the top of the channel 22. The bearing block 34 with ball bearing 36 relieve excessive loads placed on the elongated screw 38 when the trailer 12 is being leveled. This is accomplished by distributing a portion of the load from the load distribution feet 18 through the links 16, through the scissor arms 14, and onto the bearing block 34 and the ball bearings 36 riding on the top of the channel 22. The rest of the load is distributed from the other two scissor arms 14 onto the attachment channel 32. By using the bearing block 34 and bearings 36 in combination with the thrust bearing 76, the threaded screw 38 freely rotates in raising and lowering the jack 10.

Changes may be made in the construction and arrangement of the parts or elements of the embodiment as disclosed herein without departing from the spirit or scope of the invention as defined in the following claims.

I claim:

1. A self-aligning scissor type jack for leveling a vehicle on a ground surface, the jack comprising:

a base adapted for mounting underneath the frame of the vehicle;

a pair of pinned scissor arms, said arms crossed and pinned together intermediate an upper end portion and a lower end portion of said arms, the upper end portion of said arms pivotally attached to said base;

a pair of floating scissor links, said links crossed and having and upper end portion and a lower end portion, the upper end portion of said links pivotally attached to the lower end portion of said arms;

a load distribution foot, the ends of said foot including elongated slots therein, the lower end portion of said links slidably attached to the slotted ends of said foot, said load distribution foot contacting the ground surface when the jack is lowered and adjusting said links to the contour of the ground surface for distributing the load thereon and distributing the load to said arms; and drive means mounted on said base and attached to the upper end portion of said arms, said drive means when activated moving the linear distance between the upper end portion of said arms thereby raising and lowering the jack on the vehicle.

2. The jack as described in claim 1 wherein said drive means includes an elongated threaded screw mounted on said base, said elongated screw threadably received through a bearing block, said bearing block pivotally attached to the upper end portion of one of said arms, said elongated screw adapted for receiving one end of a handle, by rotating said handle, said threaded screw is rotated thereby moving said bearing block along said elongated screw and moving the linear distance between the upper end portion of said arms.

3. The jack as described in claim 1 wherein said drive means includes a drive gear motor mounted on said base and attached to one end of an elongated screw, the other end of said screw attached to said base, said elongated screw threadably received through a bearing block, said bearing block pivotally attached to the upper end portion of one of said arms, when said gear motor is activated, said threaded screw is rotated thereby moving said bearing block along said elongated screw and moving the linear distance between the upper end portion of said arms.

4. The jack as described in claim 3, wherein said drive means further includes a torque limitor geared to said drive gear motor and releasably engaged to one end of said threaded elongated screw when excessive torque is placed thereon to prevent the overloading of the jack when the jack is raised and lowered on the vehicle.

5. The jack as described in claim 1, wherein said base is an elongated inverted "U"-shaped channel, said "U"-shaped channel housing said drive means and the upper end portion of said arms.

6. The jack as described in claim 1, further including two pairs of said arms, two pairs of said links, and a pair of load distribution feet, said arms, said links, and said feet parallel to each other and joined together in a spaced relationship by upper and lower support pins, the lower end portion of said arms and the upper end portion of said links joined together by upper support pins, the lower end portion of said links and the ends of said feet joined together by lower support pins.

7. A self-aligning scissor type jack for leveling a vehicle on a ground surface, the jack comprising:

an inverted "U"-shaped channel adapted for mounting underneath the frame of the vehicle;

two pairs of pinned scissor arms, said arms crossed and pinned together intermediate an upper end portion and a lower end portion of said arms, the upper end portion of said arms pivotally attached to said channel;

two pairs of floating scissor links, said links crossed and having an upper end portion and a lower end portion, the upper end portion of said links pivotally attached to the lower end portion of said arms;

a pair of load distribution feet, the ends of said feet including elongated slots therein, the lower end portion of said links slidably attached to the slotted ends of said feet, said load distribution feet contacting the ground surface when the jack is lowered and adjusting said links to the contour of the ground surface for distributing the load thereon and distributing the load to said arms;

upper support pins joining together the lower end portion of said arms and the upper end portion of said links;

lower support pins joining together the lower end portion of said links and the slotted ends of said feet; and drive means mounted on said base and attached to the upper end portion of said arms, said drive means when activated moving the linear distance between the upper end portion of said arms thereby raising and lowering the jack on the vehicle.

8. The jack as described in claim 7 further including a ground engaging pad attached to the bottom of said load distribution feet.

9. The jack as described in claim 7 further including a switch plate mounted in one end of said channel and housed therein, said switch plate having an electric switch attached thereto and wired to said drive means and an electric power source, by turning said switch on said drive means is activated.

* * * * *